(12) United States Patent
Sudjianto et al.

(10) Patent No.: US 8,396,789 B1
(45) Date of Patent: Mar. 12, 2013

(54) CREDIT-APPROVAL DECISION MODELS

(75) Inventors: Agus Sudjianto, Matthews, NC (US); Peter B. Vechnak, Charlotte, NC (US); Michelle Warholic, Cherry Hill, NJ (US); Meghan Alita Steach, Charlotte, NC (US); Jie Chen, Chappaqua, NY (US)

(73) Assignee: Bank of America Corporation, Charlotte, NC (US)

( * ) Notice: Subject to any disclaimer, the term of this patent is extended or adjusted under 35 U.S.C. 154(b) by 323 days.

(21) Appl. No.: 12/651,666

(22) Filed: Jan. 4, 2010

Related U.S. Application Data

(63) Continuation-in-part of application No. 12/541,728, filed on Aug. 14, 2009.

(51) Int. Cl.
*G06Q 40/00* (2006.01)
(52) U.S. Cl. ............ 705/38
(58) Field of Classification Search .............. None
See application file for complete search history.

(56) References Cited

U.S. PATENT DOCUMENTS

| | | | |
|---|---|---|---|
| 7,418,417 B2 * | 8/2008 | Chacko et al. | 705/36 R |
| 7,653,593 B2 * | 1/2010 | Zarikian et al. | 705/38 |
| 7,991,666 B2 * | 8/2011 | Haggerty et al. | 705/35 |
| 8,099,356 B2 * | 1/2012 | Feinstein et al. | 705/38 |
| 8,296,224 B2 * | 10/2012 | Oliveira et al. | 705/38 |
| 2007/0100719 A1 * | 5/2007 | Chwast et al. | 705/35 |
| 2007/0203827 A1 * | 8/2007 | Simpson et al. | 705/38 |
| 2008/0221990 A1 * | 9/2008 | Megdal et al. | 705/14 |
| 2008/0222015 A1 | 9/2008 | Megdal et al. | |
| 2009/0144160 A1 | 6/2009 | Haggerty et al. | |

OTHER PUBLICATIONS

The Usefulness of Financial Ratio Analysis for Discrimination of Small Business Credit Risks Author: O'Rourke, Vincent, Jr. Degree: Ph.D. Year: 1982 Corporate Source/Institution: The University of Utah (0240) Source: vol. 43/01-A of Dissertation Abstracts International. p. 198. 252 Pages.*
Decisions to Purchase Consumer Durable Goods Klein, L R Journal of Marketing (pre-1986); 1955; 20, ProQuest Central p. 109.*
Three essays on china's economic development. University of California, Berkeley). ProQuest Dissertations and Theses, Meng, X. (2009)., 152. Retrieved from http://search.proquest.com/docview/518938276?accountid=14753. (518938276).*
U.S. Appl. No. 12/541,728, filed Aug. 14, 2009.

* cited by examiner

*Primary Examiner* — Bruce I Ebersman
(74) *Attorney, Agent, or Firm* — Michael A. Springs; Moore & Van Allen, PLLC; Padowithz Alce

(57) ABSTRACT

Embodiments of the present invention evaluate consumer spending and borrowing patterns and, based thereon, forecast changes in consumer failure to repay rates. Embodiments of the present invention then develop macroeconomic variables that reflect the forecasted changes in consumer failure to repay rates and implement those macroeconomic variables into credit-approval decision models. The implemented macroeconomic variables adjust the decision models' credit-approval thresholds to account for the forecasted changes in consumer failure to repay rates. For example, if forecasts indicate decreasing credit failure to repay rates, then macroeconomic variables are developed and implemented in decision models to reduce credit-approval thresholds, thereby reducing qualifying creditworthiness scores and making it easier to get credit. On the other hand, for example, if forecasts indicate increasing credit failure to repay rates, then macroeconomic variables are developed and implemented in decision models to increase credit-approval thresholds, thereby restricting access to credit and reducing future losses from consumer failures to repay.

30 Claims, 7 Drawing Sheets

| RANK | # OF INDIV | % OF INDIV | CREDITWORTHINESS SCORE | | | AVG DEFAULT RATE |
|---|---|---|---|---|---|---|
| | | | MIN | MAX | AVG. | |
| 1 | 102,280 | 10% | 985.728155 | 999.181175 | 989.923439 | 0.99% |
| 2 | 102,281 | 10% | 979.644803 | 985.727885 | 982.598769 | 1.75% |
| 3 | 102,282 | 10% | 973.995758 | 979.644705 | 976.8168455 | 2.31% |
| 4 | 102,284 | 10% | 968.114303 | 973.995726 | 971.103170 | 2.88% |
| 5 | 102,280 | 10% | 961.444634 | 968.114298 | 964.870888 | 3.58% |
| 6 | 102,280 | 10% | 953.260078 | 961.444557 | 957.527816 | 4.34% |
| 7 | 102,283 | 10% | 942.540176 | 953.260055 | 948.185019 | 5.54% |
| 8 | 102,283 | 10% | 926.875758 | 942.539435 | 935.345988 | 6.72% |
| 9 | 102,283 | 10% | 897.036501 | 926.874607 | 913.924015 | 8.65% |
| 10 | 102,284 | 10% | 96.157001 | 897.032756 | 839.298144 | 15.42% |

| DATE | MACROECONOMIC VARIABLE |
|---|---|
| 200605 | -0.0844545296831215 |
| 200606 | -0.0820336961678633 |
| 200607 | -0.0788795781951278 |
| 200608 | -0.0750180995938245 |
| 200609 | -0.0704875975189908 |
| 200610 | -0.0653285626884180 |
| 200611 | -0.0595906703839480 |
| 200612 | -0.0533264563482425 |
| 200701 | -0.0465853538424730 |
| 200702 | -0.0394126014675937 |
| 200703 | -0.0318372001659070 |
| 200704 | -0.0238825991287982 |
| 200705 | -0.0155760422975489 |
| 200706 | -0.0069518491139851 |
| 200707 | -0.0019570935690030 |

FIG. 6

CREDIT-APPROVAL DECISION MODELS

CROSS-REFERENCE TO RELATED APPLICATION

This application is a continuation-in-part of co-pending patent application Ser. No. 12/541,728 filed Aug. 14, 2009, entitled "Consumer Leverage Modeling", the entire disclosure of which is incorporated herein by reference.

FIELD

In general, embodiments of the present invention relate to systems, methods and computer program products for developing credit-approval decision models that adjust credit-approval thresholds to account for forecasted changes in consumer failure to repay rates.

BACKGROUND

Creditor institutions often rely on creditworthiness scores when determining whether to accept or deny an individual's application for a credit product, such as a credit card or line of credit. Some creditor institutions buy creditworthiness scores, such as FICO scores, from consumer reporting agencies ("CRAs"). CRAs collect personal and financial information about individual consumers, generate a credit report to indicate the creditworthiness of individual consumers, and sell these credit reports to prospective creditors. More specifically, CRAs collect personal and financial information about individual consumers from a variety of sources called data furnishers. These data furnishers are typically institutions that have had financial relationships with individual consumers. For example, data furnishers may be creditors, lenders, utility companies, debt collection agencies, government agencies, and courts. Data furnishers report data regarding individual consumers to CRAs, and, based on the received data, CRAs generate a credit report for each individual consumer. A typical credit report contains detailed information about an individual consumer's credit history, including credit accounts and loans, proceedings for a person unable to repay outstanding financial obligations, late payments, and recent inquiries. The CRAs then calculate the creditworthiness score using the information provided in the credit report. Some creditor institutions develop their own creditworthiness scores based on their own past experiences with individuals. Oftentimes, these creditor institutions combine their own creditworthiness scores with those purchased from CRAs to create a blended creditworthiness score.

Before a creditor institution can use a creditworthiness score to make a credit-approval determination for an individual credit applicant, the creditor institution must first establish credit-approval thresholds. For example, for each credit product offered, the creditor institution must determine a range of creditworthiness scores that would qualify an individual for that credit product. Credit products that have higher lines of credit will require higher qualifying creditworthiness scores than those with lower lines of credit.

To establish credit-approval thresholds, creditor institutions sometimes develop decision models around historical-performance data taken from individuals having varying creditworthiness scores. A creditor institution may build a decision model around historical-performance data taken from individuals that have varying credit worthiness scores and, for example, were booked for a particular credit product sometime between January 2003 and December 2004. In this case, the creditor institution would build the decision model to group individuals by creditworthiness scores and calculate the average failure to repay rate for each group. In this case, the creditor institution could input a particular credit applicant's creditworthiness score, and the model would output the average failure to repay rate for the group to which that individual belongs. The outputted failure to repay rate represents the likelihood that the particular credit applicant will fail to repay. If the outputted failure to repay rate is acceptable to the creditor institution, then the institution approves the particular credit-applicant's credit application, provided the particular credit-applicant meets all other requirements.

Instead of using the decision model to approve or deny individual applicants' credit applications on a case-by-case basis, some creditor institutions use decision models to establish credit-approval thresholds. For example, a creditor institution can determine an acceptable rate of failure to repay for a particular credit product, and then refer to the risk model to identify the creditworthiness score associated with the determined acceptable rate of failure to repay. This creditworthiness score becomes the credit-approval threshold for that particular product. Accordingly, when making credit-approval determinations, the creditor institution approves applicants having creditworthiness scores equal to or higher than the credit-approval threshold and rejects those having creditworthiness scores lower than the credit-approval threshold.

However, because the exemplary decision model described above was built using historical-performance data taken from individuals that were booked sometime between January 2003 and December 2004, assumptions about the economic environment of that time are built into the model. Accordingly, the decision model is static and unable to account for fluctuations in the business cycle and other economic conditions that affect borrowers' ability to repay debt. This exemplary decision model would under-predict risk if used to make approval decisions or establish credit-approval thresholds in 2008, because the economic environment in 2008 was less stable than the economic environment around which the decision model was built. Under predicting risk would lead to actual failure to repay rates that are higher than the failure to repay rates predicted by the decision model. On the other hand, this exemplary decision model would over-predict risk if used to make approval decisions or establish credit-approval thresholds when the economic environment is more stable than the economic environment around which the decision model was built. Over predicting risk would lead to unnecessary credit restrictions.

Even if the exemplary decision model were frequently updated with the most recent historical-performance data, the decision model would still be using historical data to predict future failure to repay rates. Accordingly, the decision model will always lag fluctuations in the business cycle, thereby resulting in credit-approval thresholds that are adjusted in response to, instead of in anticipation of, fluctuations in the business cycle.

There is a need for systems, devices, methods, and other tools that provide decision models incorporated with macroeconomic variables that enable the decision models to anticipate fluctuations in the business cycle.

SUMMARY

Embodiments of the present invention evaluate consumer spending and borrowing patterns and, based thereon, forecast changes in consumer failure to repay rates. Embodiments of the present invention then develop macroeconomic variables that reflect the forecasted changes in consumer failure to repay rates and implement those macroeconomic variables into credit-approval decision models. The implemented macroeconomic variables adjust the decision models' credit-approval thresholds to account for the forecasted changes in consumer failure to repay rates. For example, if forecasts indicate decreasing credit failure to repay rates, then macroeconomic variables are developed and implemented in decision models to reduce credit-approval thresholds, thereby reducing qualifying creditworthiness scores and making it easier to get credit. On the other hand, for example, if forecasts indicate increasing credit failure to repay rates, then macroeconomic variables are developed and implemented in decision models to increase credit-approval thresholds, thereby restricting access to credit and reducing future losses from consumer failures to repay.

According to an embodiment, a method is provided for determining a credit-approval threshold. According to this embodiment, the method comprises establishing a credit-approval threshold that corresponds to an acceptable failure to repay rate and receiving data taken across a plurality of consumers. According to an embodiment, the data comprises a total spending amount over a period of time and a total debt amount over a period of time. According to this embodiment, the method further comprises using a processor to: determine a value of a ratio that compares an actual growth rate of the total debt amount and an actual growth rate of the total spending amount; determine a value of an equilibrium of the ratio that compares the actual growth rate of the total debt amount and the actual growth rate of the total spending amount; compare the value of the ratio to the value of the equilibrium of the ratio; calculate a macroeconomic variable, wherein the macroeconomic variable is based on the difference between the value of the ratio and the value of the equilibrium of the ratio; and adjust the credit-approval threshold by an amount equal to the macroeconomic variable.

According to another embodiment, a system is provided that comprises a database and a processor. According to this embodiment, the database comprises: credit-history data about each of a plurality of individuals; a creditworthiness score for each of the individuals; a credit-approval threshold; a total debt amount based on data taken across a plurality of consumers; and a total spending amount based on data taken across the plurality of consumers. According to this embodiment, the processor is associated with the database and configured to execute an application for calculating a macroeconomic variable, wherein the application executed by the processor is configured to: determine a value of a ratio that compares an actual growth rate of the total debt amount and an actual growth rate of the total spending amount; determine a value of an equilibrium of the ratio that compares the actual growth rate of the total debt amount and the actual growth rate of the total spending amount; compare the value of the ratio to the value of the equilibrium of the ratio; and calculate the macroeconomic variable, wherein the macroeconomic variable is equal to the difference between the value of the ratio and the value of the equilibrium of the ratio.

According to yet another embodiment, a computer program product is provided and configured to adjust credit-approval thresholds. According to this embodiment, the computer program product comprising a computer-readable medium having computer-readable program instructions stored therein, wherein the computer-readable program instructions comprise: first instructions for selecting a plurality of individuals; second instructions for obtaining credit-history data about each of the individuals; third instructions for assigning a creditworthiness score to each of the individuals; fourth instructions for establishing at least a credit-approval threshold; fifth instructions configured to receive data taken across a plurality of consumers nationwide, wherein the data comprises: a total spending amount; and a total debt amount; sixth instructions configured to determine a value of a ratio that compares an actual growth rate of the total debt amount and an actual growth rate of the total spending amount; seventh instructions configured to determine a value of an equilibrium of the ratio that compares the actual growth rate of the total debt amount and the actual growth rate of the total spending amount; eighth instructions configured to compare the value of the ratio to the value of the equilibrium of the ratio; ninth instructions configured to calculate a macroeconomic variable, wherein the macroeconomic variable is equal to the difference between the value of the ratio and the value of the equilibrium of the ratio; tenth instructions configured to recalculate the macroeconomic variable on a monthly basis; and eleventh instructions configured to adjust the credit-approval threshold on a monthly basis by an amount equal to the macroeconomic variable.

According to still another embodiment, a system is provided for determining a credit-approval threshold. According to this embodiment, the system comprises a memory device and a process, where the memory device comprises: computer-readable program code; a total spending amount over a period of time; and a total debt amount over a period of time. The processor, according to this embodiment, is operatively coupled to the user interface and the memory device and configured to execute the computer-readable program code to: determine a value of a ratio that compares an actual growth rate of the total debt amount and an actual growth rate of the total spending amount; determine a value of an equilibrium of the ratio that compares the actual growth rate of the total debt amount and the actual growth rate of the total spending amount; compare the value of the ratio to the value of the equilibrium of the ratio; calculate a macroeconomic variable, wherein the macroeconomic variable is based on the difference between the value of the ratio and the value of the equilibrium of the ratio; and adjust the credit-approval threshold by an amount equal to the macroeconomic variable.

BRIEF DESCRIPTION OF THE DRAWINGS

Figure 1:
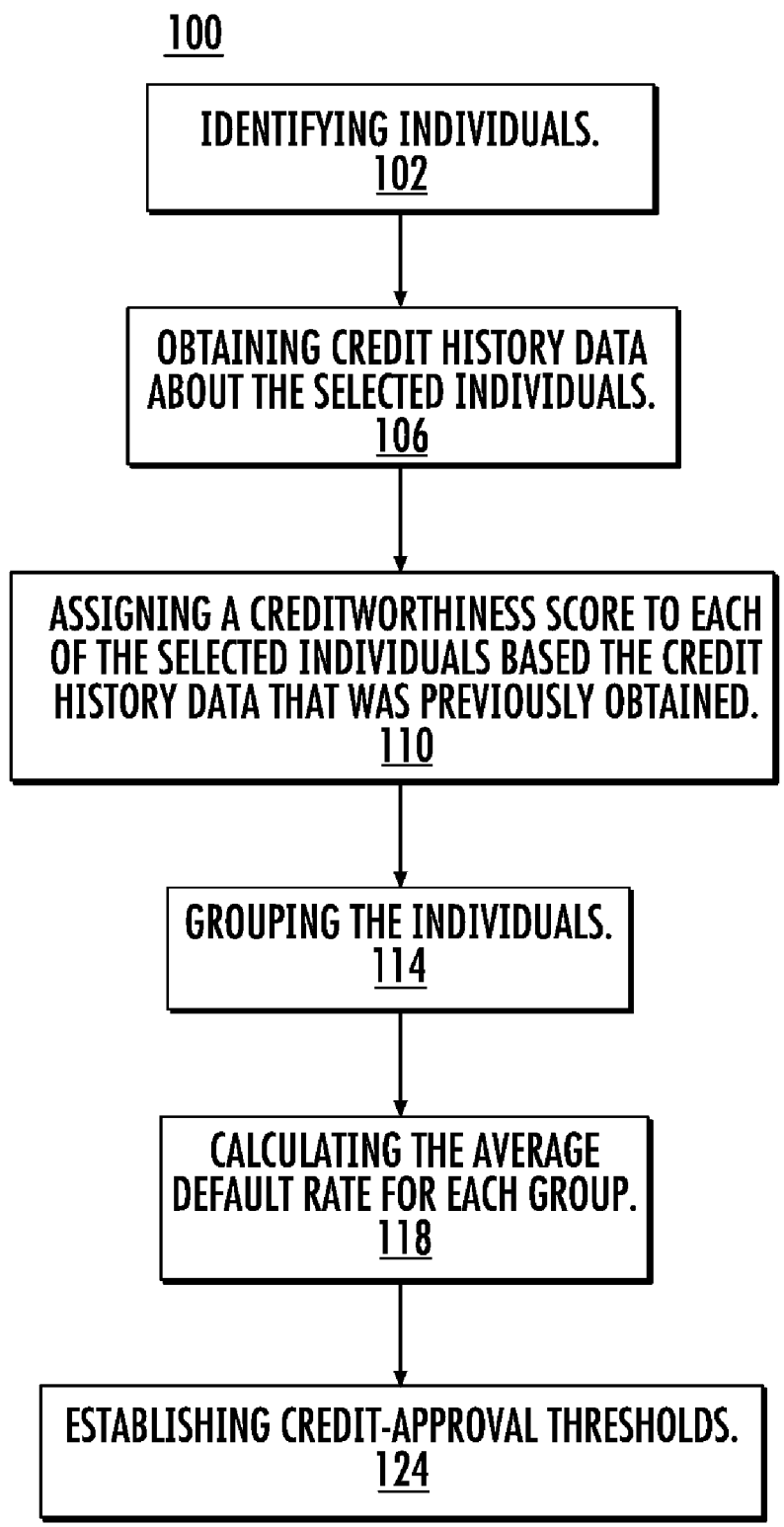
Figure 3:
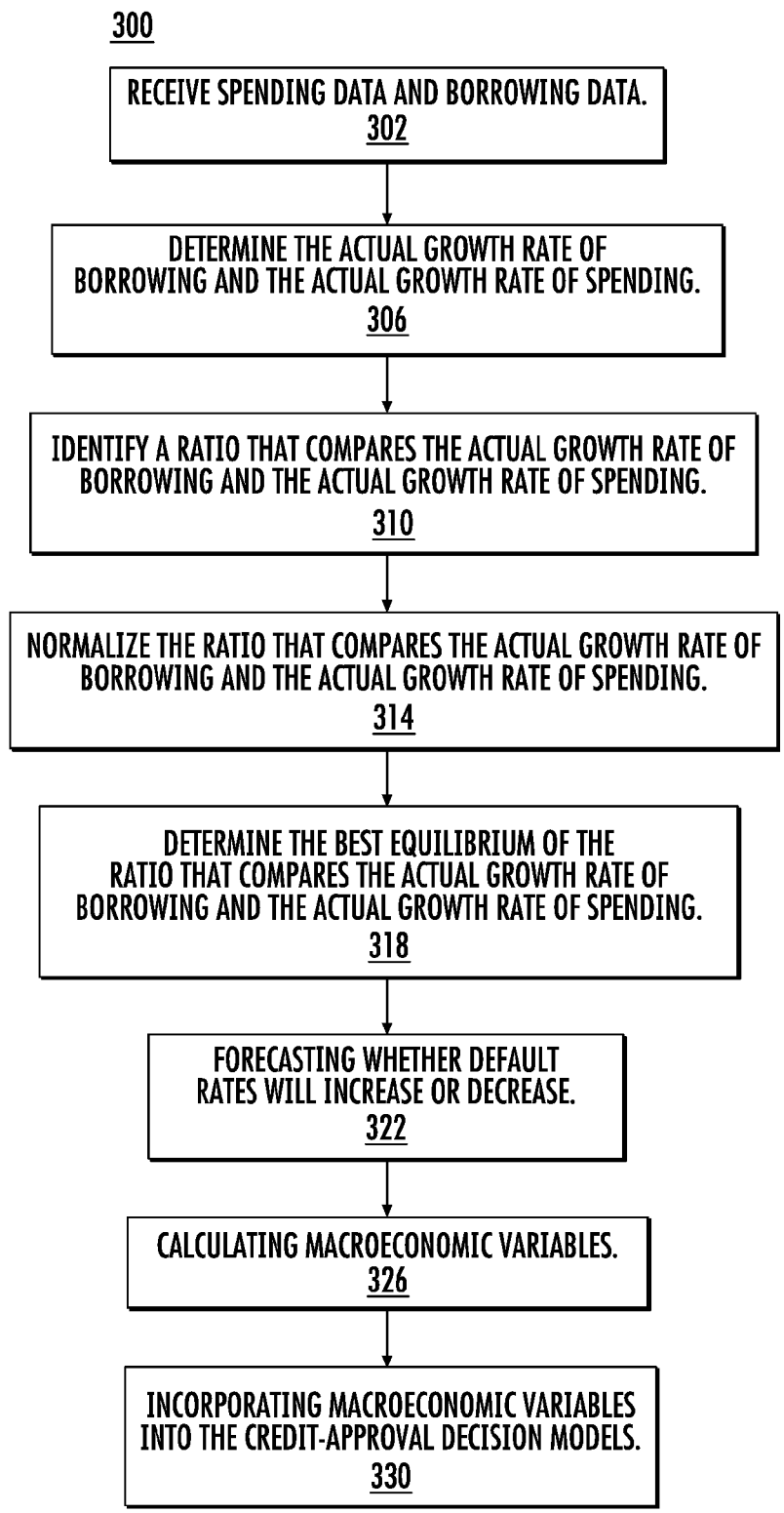
Figure 4:
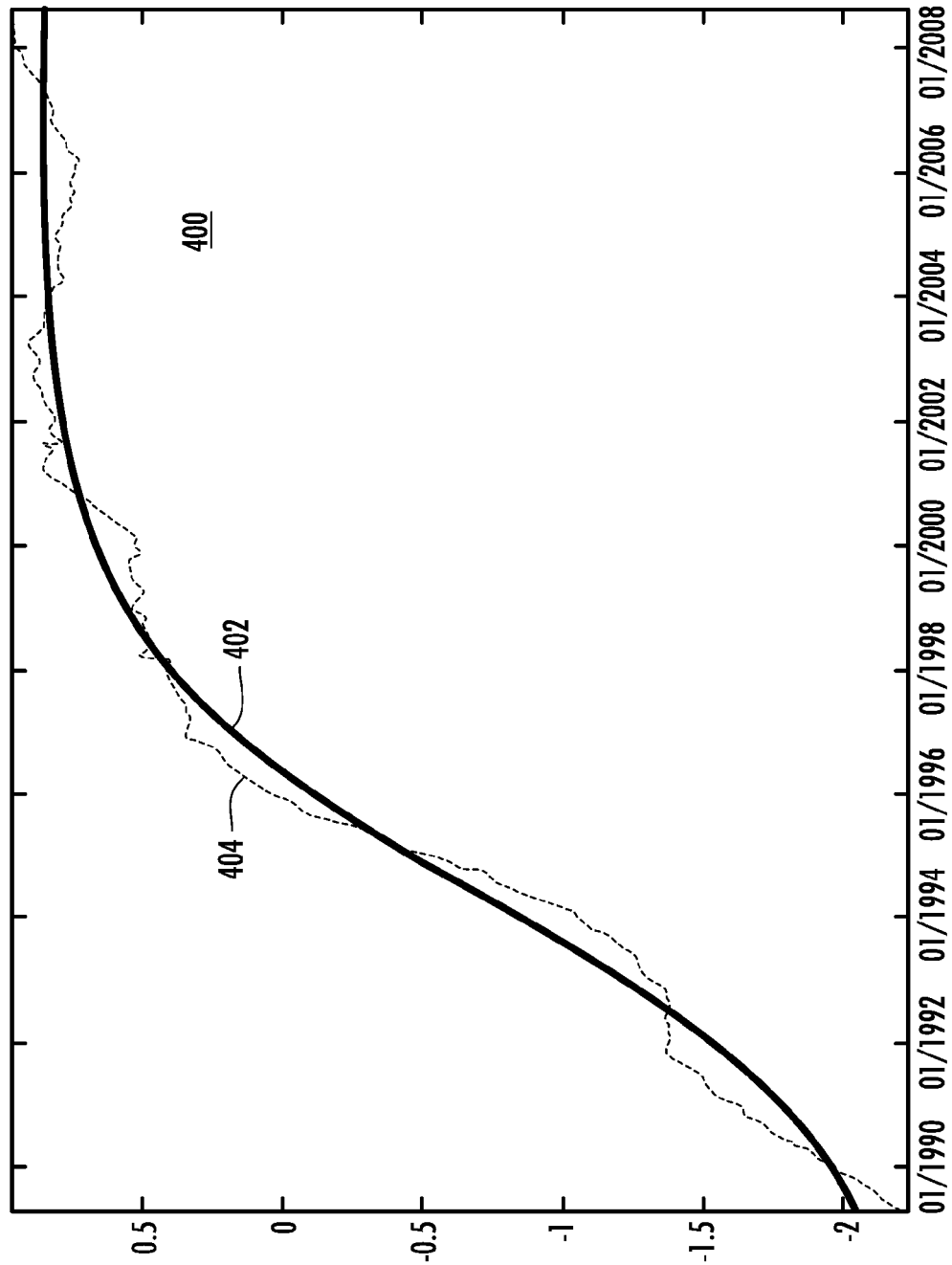
Figure 5:
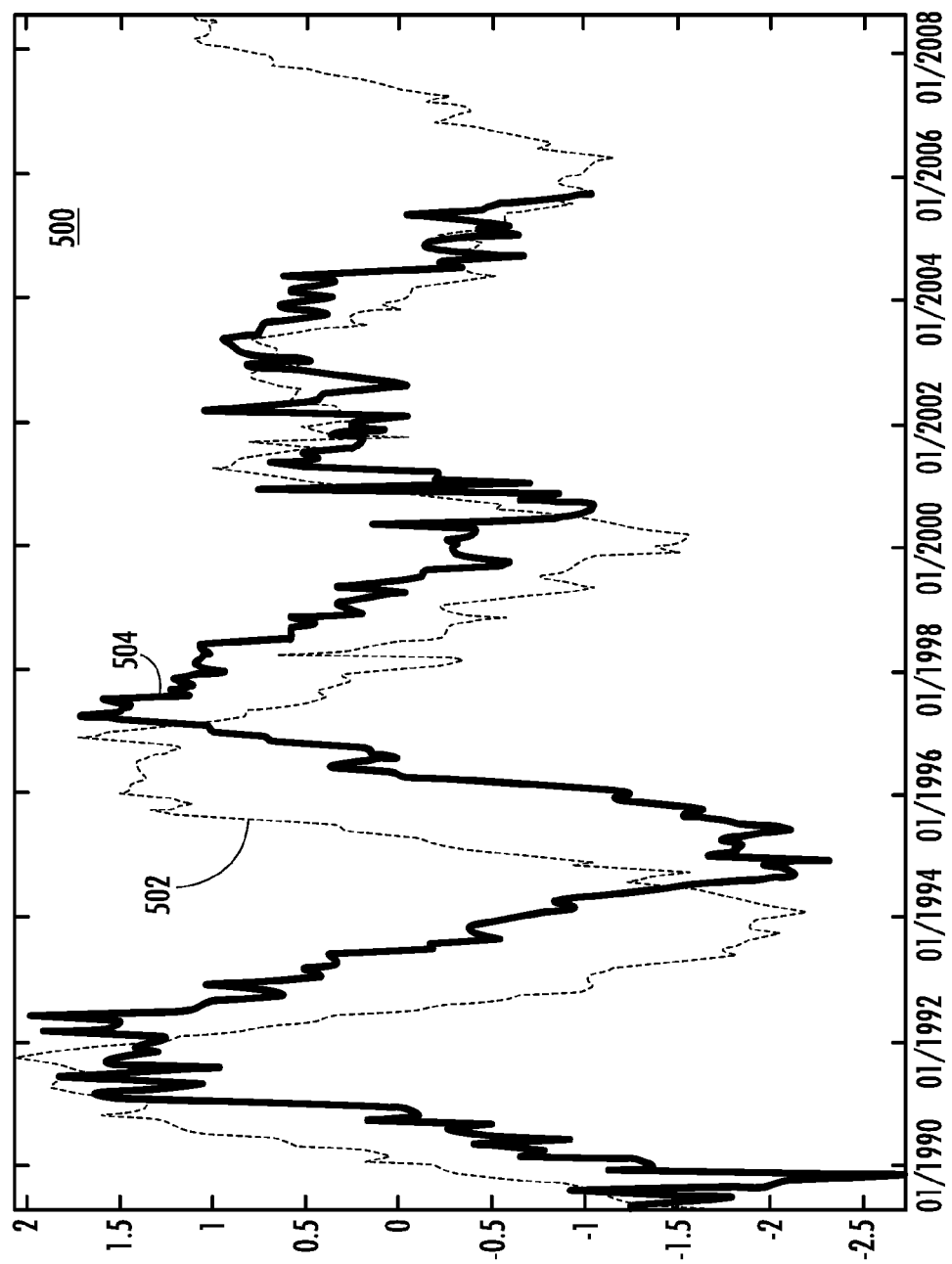
Figure 7:
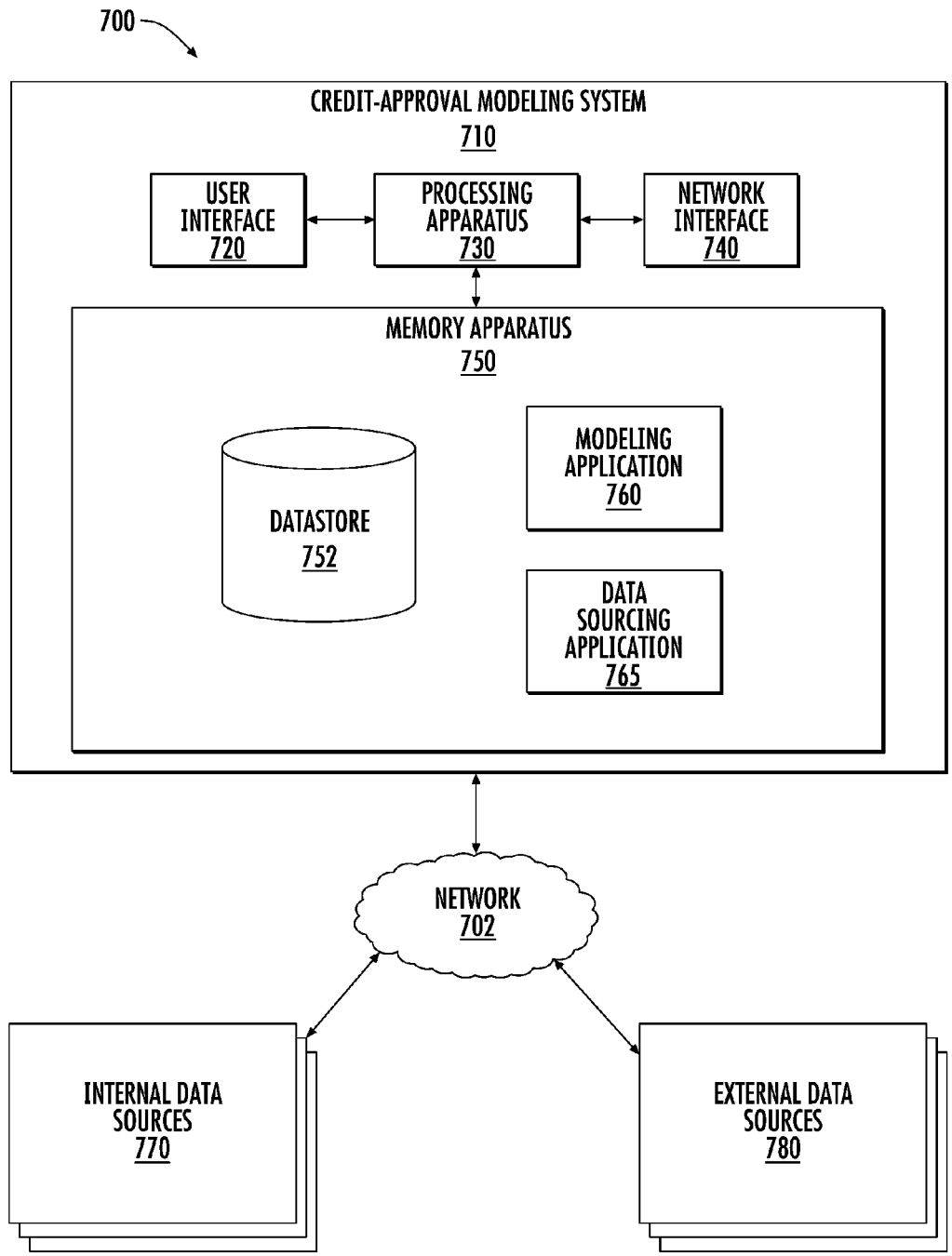

Having thus described embodiments of the invention in general terms, reference will now be made to the accompanying drawings wherein:

FIG. 1 is a flow chart illustrating an exemplary process for constructing an exemplary credit-approval decision model, according to an embodiment of the present invention;

FIG. 2 is an exemplary decision model that provides an exemplary list of groups of individuals and corresponding creditworthiness scores and failure to repay rates, according to an embodiment of the present invention;

FIG. 3 is a flow chart illustrating an exemplary process of: constructing and using a consumer-leverage model to forecast changes in consumer failure to repay rates; developing macroeconomic variables that reflect the forecasted changes in consumer failure to repay rates; and implementing those macroeconomic variables into credit-approval decision models, according to an embodiment of the present invention;

FIG. 4 is an exemplary consumer-leverage model having a curve that represents the normalized value of a first ratio and another curve that represents the normalized value of a second ratio, where the first ratio compares the equilibrium growth rate of consumers' monthly borrowing and spending and where the second ratio compares the actual growth rate of consumers' monthly borrowing and spending, according to an embodiment of the present invention;

FIG. 5 is an exemplary chart that provides a curve that represents a relationship between the first and second ratios and another curve that represents detrended net non-collectables, according to an embodiment of the present invention;

FIG. 6 is a table that provides an exemplary list of macroeconomic variables, according to an embodiment of the present invention; and FIG. 7 illustrates an environment in which the processes described herein are implemented, according to an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention evaluate consumer spending and borrowing patterns and, based thereon, forecast changes in consumer failure to repay rates. Embodiments of the present invention then develop macroeconomic variables that reflect the forecasted changes in consumer failure to repay rates and implement those macroeconomic variables into credit-approval decision models. The implemented macroeconomic variables adjust the decision models' credit-approval thresholds to account for the forecasted changes in consumer failure to repay rates. For example, if forecasts indicate decreasing credit failure to repay rates, then macroeconomic variables are developed and implemented in decision models to reduce credit-approval thresholds, thereby reducing qualifying creditworthiness scores and making it easier for consumers to meet credit-approval standards and to get credit. On the other hand, for example, if forecasts indicate increasing credit failure to repay rates, then macroeconomic variables are developed and implemented in decision models to increase credit-approval thresholds, thereby making it harder for consumers to meet credit-approval standards. This restriction on access to credit reduces future losses from consumer failures to repay.

Embodiments of the present invention will be described herein as being used by creditor institution, such as a bank or credit card company, to do any number of the following: build credit-approval decision models; forecast changes in consumer failure to repay rates based on nationwide consumer spending and borrowing patterns; develop macroeconomic variables that reflect the forecasted changes in consumer failure to repay rates; implement those macroeconomic variables into the credit-approval decision models and thereby adjust credit-approval thresholds to account for the forecasted changes in consumer failure to repay rates; and apply the credit-approval thresholds provided by the credit-approval decision models to determine whether to approve individual applicants' applications for credit products. It should be appreciated, however, that the presented invention is not limited to use by creditor institutions and that embodiments of the present invention could be used by any individual or institution or business or non-business entity or portion thereof.

FIG. 1 provides a flow diagram illustrating an exemplary process 100 for constructing an exemplary credit-approval decision model. As indicated at block 102, the process 100 generally begins with identifying individuals whose credit-history data will be used to build the credit-approval decision model. For example, if the decision model is being built for generating credit-approval thresholds for a particular credit product, then individuals who have previously owned a credit product similar to the particular credit product under review are identified. The particular credit product can be, for example, a particular type of credit card, personal loan, business loan, home mortgage, home equity loan, line of credit, etc. The identified individuals can be individuals that have owned or utilized particular credit products that were issued by the creditor institution that is building the decision model and/or creditor institutions other than the one building the decision model.

Next, as represented at block 106, the process 100 involves obtaining credit-history data about the identified individuals. Credit-history data about the identified individuals can be obtained from CRAs. Credit-history data obtained from CRAs includes data that is gathered from multiple creditor institutions and that is related to how well individuals have managed credit products in the past. For those individuals who have owned credit products issued by the creditor institution that is building the decision model, credit-history data can be provided by the creditor institution itself. The decision model can be built around credit-history data provided by the creditor institution itself and/or credit-history data provided by CRAs.

As represented by block 110, the process 100 further includes determining a creditworthiness score for each identified individual based on each respective individual's credit-history data. Creditworthiness scores can be based on financial data, such as individuals' credit accounts and loans, credit utilization, income, proceedings for a person unable to repay outstanding financial obligations, late payments, and recent inquiries and non-financial data, such as age, marital status, and city of residence. In some embodiments, the creditor institution buys creditworthiness scores from CRAs. In other embodiments, the creditor institution calculates its own creditworthiness scores for the individuals based on its own past experiences with individuals. In still other embodiments, the creditor institution combines its own creditworthiness scores with those purchased from CRAs to create blended creditworthiness scores.

Next, as represented by block 114, the process 100 further includes grouping the identified individuals by creditworthiness scores. For illustrative convenience, this step of grouping identified individuals will be described with reference to FIG. 2, which provides an exemplary credit-approval decision model 200. The decision model 200 lists each group and its corresponding average creditworthiness score and average failure to repay rate. As illustrated in the decision model 200, the identified individuals are partitioned into ten groups based on their creditworthiness scores. It should be appreciated that the identified individuals can be partitioned into any number of groups. As indicated in columns 204 and 208, each group includes, for example, ten percent of the total number of identified individuals. The groups are rank-ordered according to average creditworthiness scores, which are provided in column 210. The group with the highest average creditworthiness score is ranked first, whereas the group with the lowest average creditworthiness score is ranked tenth. As represented by block 118, the process 100 further includes calculating the average failure to repay rate for each group. The exemplary average failure to repay rates are listed in column 214 of the decision model 200.

As represented by block 124, the process 100 further includes establishing credit-approval thresholds that are to be used when determining whether to approve an applicant's credit application. According to some embodiments, in light of the particular credit product in question, the creditor institution selects an acceptable failure to repay rate, which reflects the highest failure to repay rate that the creditor institution can or wants to endure for the particular credit product in question. Then, the credit-approval threshold is set to correspond to selected acceptable failure to repay rate. In an embodiment, the credit-approval threshold is the creditworthiness score that has historically resulted in a failure to repay rate equal to the selected acceptable failure to repay rate. For example, with reference to the decision model 200 of FIG. 2, if the creditor institution selects an acceptable failure to repay rate of approximately 3.5%, then the credit-approval threshold is set to a creditworthiness score of approximately 965.

The creditor institution can use the credit-approval threshold(s) provided by the credit-approval decision model to make credit-approval determination. For example, when making credit-approval determinations, the creditor institution approves applicants having creditworthiness scores equal to or higher than the credit-approval threshold and rejects those having creditworthiness scores lower than the credit-approval threshold.

It should be appreciated that, for some credit products, the creditor institution may choose to implement a credit-approval policy that relies on multiple credit-approval thresholds. For example, a credit-approval policy may dictate: automatic approval for applicants having creditworthiness scores greater than or equal to an upper credit-approval threshold; flagging for further review applicants having creditworthiness scores between the upper threshold and a lower threshold; and automatically denying applicants having creditworthiness scores less than or equal to the lower threshold. In this case, when building the credit-approval decision model, instead of selecting an acceptable failure to repay rate, the creditor institution selects an upper failure to repay rate and a lower failure to repay rate. The upper credit-approval threshold is set to the creditworthiness score that has historically resulted in a failure to repay rate equal to the selected upper failure to repay rate, and the lower credit-approval threshold is set to the creditworthiness score that has historically resulted in a failure to repay rate equal to the selected lower failure to repay rate.

It should be appreciated that the credit-approval threshold may vary from product to product because it may make financial sense for the creditor institution to tolerate slightly higher failure to repay rates for some products. For example, credit cards typically have higher interest rates than home equity loans. Further, an individual failure to repay on a credit card typically results in a smaller loss than an individual failure to repay on a home equity loan. Accordingly, because credit cards yield a relatively high return and because a single failure to repay would result in a relatively low loss, the financial institution may select a higher acceptable failure to repay rate for credit cards than it would for home equity loans. A higher acceptable failure to repay rate would result in a lower credit-approval threshold.

Turning now from building credit-approval decision models to adjusting credit-approval decision models to account for forecasted changes in the failure to repay rates. FIG. 3 provides a flow diagram illustrating an exemplary process 300 for evaluating consumer spending and borrowing patterns and, based thereon, forecast changes in consumer failure to repay rates. The exemplary process 300 further provides for calculating macroeconomic variables that reflect the forecasted changes in consumer failure to repay rates and implementing those macroeconomic variables into credit-approval decision models in order to adjust the decision models' credit-approval thresholds to account for the forecasted changes in consumer failure to repay rates.

As represented by block 302, the process 300 generally begins with receiving spending data and borrowing data taken nationwide from across a large number consumers. To do so, embodiments of the present invention collect transaction data from government and non-government entities, such as CRAs, that collect nationwide spending data and borrowing data. The term "spending data" as used herein refers to data that indicates the value of goods and services consumed. The term "borrowing data" as used herein refers to data that indicates the value of funds consumers withdraw from revolving credit accounts.

In an embodiment, spending data is received on a monthly basis from the Bureau of Economic Analysis, an agency of the U.S. Department of Commerce, in the form of a monthly report that outlines the month's personal consumption expenditures. The report provides the actual and imputed monthly expenditures of all households in the United States. In other words, the monthly report includes spending data that represents the value of funds spent on goods and services targeted for individual consumption. This value is referred to herein as PCE.

In an embodiment, the present invention also receives borrowing data on a monthly basis from the United States Federal Reserve Board in the form of a monthly report that provides a value that represents the total consumer revolving credit outstanding across the entire United States. This value is referred to herein as REV. REV does not include non-revolving credit outstanding, just revolving credit outstanding. Revolving credit is composed mostly of credit card loans, but also includes some lines of credit, such as checking account overdraft protection. Non-revolving credit includes automobile loans and all other loans not including in revolving credit, such as loans for education, boats, trailers, and vacations. It should be appreciated that some embodiments of the present invention could receive and analyze non-revolving credit outstanding data and that REV could include non-revolving credit outstanding.

As represented by block 306, the process 300 further involves determining actual historical growth rates for consumer borrowing and for consumer spending. According to some embodiments, actual historical growth rates for consumer spending are determined using historical monthly PCEs, and actual historical growth rates for consumer borrowing are determined using historical monthly REVs. For example, actual historical growth rates for consumer borrowing can be determined by calculating rates of change between historical REVs, and actual historical growth rates for consumer spending can be determined by calculating rates of change between the historical PCEs.

The process 300 then involves identifying a ratio that compares the actual growth rate of consumer borrowing and the actual growth rate of consumer spending, as indicated at block 310. In some embodiments, the identified ratio that compares the actual growth rate of consumer borrowing and the actual growth rate of consumer spending is: $\log(\text{REV}_t)/\log(\text{PCE}_t)$. After identifying this ratio, the process 300, as indicated by block 314, involves normalizing the ratio. Next, the process 300 involves searching for the best logistic equilibrium of the ratio, as indicated at block 318.

Referring now to FIG. 4, graph 400 has two curves 402 and 404. Curve 402 is a smooth curve that represents the best logistic equilibrium of a ratio that compares the growth rate of consumer borrowing and consumer spending. In the illustrated embodiment, equilibrium curve 402 represents the equilibrium of $\log(REV_t)/\log(PCE_t)$. As indicated by graph 400, curve 402 has a high, positive slope in the early to mid 1990s. However, the slope approaches zero in the mid to late 2000s. This is because creditors in the United States were limited in the amount of credit they could issue up until the early 1990s, but in the early to late 1990s the United States credit market went through a period of rapid growth, where spending and borrowing increased at a rapid rate. Lenders relied on credit scoring to increase the amount of credit they issued to consumers. During this period the ratio of spending to borrowing increased dramatically, but this increase did not increase failure to repay rates because qualified borrowers were still getting absorbed and the market was still at equilibrium. In other words, during this time, qualified borrowers were obtaining credit for the first time. However, in the 2000s, the growth matured because the credit market became saturated, i.e., most qualified borrowers had consumed credit products by this time. This stabilized the growth rate of spending and borrowing.

Curve 404 represents the ratio that compares the growth rate for consumer borrowing and consumer spending, after the ratio has been normalized. In the illustrated embodiment, the curve 404 represents $\log(REV_t)/\log(PCE_t)$, after normalization. The difference between the equilibrium curve 402 and the actual curve 404 at any particular time represents consumers' leverage, ability to repay debt, and likelihood of failing to repay. For example, between 1990 and 1992, the actual curve 404 was at a higher value than the equilibrium curve 402. As such, during that time, the growth in consumer borrowing exceeded the growth in consumer spending by an unsustainable rate. For example, each time consumers spent, they also borrowed. But they failed to repay the borrowed amounts before spending again. This behavior, where consumers were borrowing faster than they were spending, created pressure in the credit market.

This pressure was relieved in the middle of 1992 when the actual curve 404 dipped to values below those of the equilibrium curve 402. This relief came mostly in the form of increasing consumer defaults, which led to increases in non-collectables. During this time, credit was withdrawn from the market and, as a result, consumers were forced to spend using their income or wealth instead of credit. And because consumers were not leveraging debt to spend, growth in consumer spending exceeded growth in consumer borrowing.

As indicated in FIG. 4, curves 402 and 404 of the consumer leverage model predicted the economic downturns of the early 1990s, the early 2000s, and the late 2000s. Before each downturn, consumer spending was decreasing and borrowing was increasing. Thus, causing the actual curve 404 to rise to values above those of the equilibrium curve 402. Toward the end of each downturn, spending was still decreasing, but spending was decreasing at a slower rate than borrowing. This led to economic stabilization in each instance.

Referring now to FIG. 5, graph 500 provides two curves 502 and 504. Curve 502 represents the difference between curves 402 and 404 of FIG. 4. This difference represents consumers' ability to repay debt and the likelihood that consumers will failure to repay. In other words, curve 502 represents the residual between the actual curve 404 and the equilibrium curve 402. For example, with reference to FIGS. 4 and 5, from 1990 to 1992, the actual curve 404 was above the equilibrium curve 402, and the residual curve 502 had a positive slope. On the other hand, from 1992 to 1994, the actual curve 404 was below the equilibrium curve 402, and the residual curve 502 had a negative slope.

Curve 504 represents detrended net non-collectables, after normalization. Net non-collectables are referred to herein as NCOs. NCOs are the direct result of consumer defaults. Accordingly, changes in NCOs are directly proportional to changes in the consumer default rate. The NCO curve 504 is constructed using NCO data that indicates the net value of uncollected funds that lenders are forced to declare as non-collectable each month because consumers are defaulting on their repayments. For example, NCO data can be obtained on a monthly basis from Moody's.

As illustrated in FIG. 5, the NCO curve 504 continuously tracks the residual curve 502 with a lag time of five to twelve months. It should be appreciated that, as the economy continuously declines, the lag time will decrease. As such, it should be appreciated that the lag time could have shortened to about two to eight months after the economic downturn that occurred toward then end of the 2000s. Because the NCO curve 504 tracks the residual curve 502, the present invention uses the residual curve 502 to predict the NCO curve 504 and thereby predict changes in NCOs, changes in consumers' ability to repay debt, and changes in consumer failure to repay rates.

For example, when the slope of the residual curve 502 changes from positive to negative, the slope of the NCO curve 504 follows. As previously mentioned, the residual curve 502 represents the difference between the actual curve 404 and the equilibrium curve 402. When borrowing increases at a faster rate than spending, the actual curve 404 rises to values above those of the equilibrium curve 402 and thereby causes residual curve 502 to have a positive slope. This means NCOs and consumer failure to repay rates will increase in the following months. However, when borrowing continues but spending increases such that is increasing faster than borrowing, the actual curve 404 begins dropping to values lower than those of the equilibrium curve 402 and the slope of the residual curve 502 changes from positive to negative. This means NCOs and consumer failure to repay rates will begin to decrease in the following months.

Referring again to FIG. 3, as indicated at block 322, the process 300 further involves forecasting whether NCOs and consumer failure to repay rates will increase or decrease in the future. In an embodiment, forecasting is accomplished by monitoring the value of the actual curve 404 and the value of the equilibrium curve 402. For example, if, at the time of inquiry, the value of the actual curve 404 is higher than the value of the equilibrium curve 402 and the residual curve 502 has a positive slope, then the process 300 forecasts that NCOs and consumer failure to repay rates will increase. If, on the other hand, the actual curve 404 is at a lower value than the equilibrium curve 402 and the residual curve 502 has a negative slope, then the process 300 forecasts that NCOs and consumer failure to repay rates will decrease.

Next, as represented at block 326, the process 300 involves calculating a macroeconomic variable. According to some embodiments, the macroeconomic variable is the difference between the value of the actual curve 404 and the value of the equilibrium curve 402. Accordingly, to calculate the macroeconomic variable, the process 300 involves determining the difference between the value of the actual curve 404 and the value of the equilibrium curve 402.

If the value of the actual curve 404 is lower than the value of the equilibrium curve 402, then the macroeconomic variable is negative, which indicates that NCOs and consumer failure to repay rates will decrease in the following months. However, if the value of the actual curve 404 is greater than the value of the equilibrium curve 402, then the macroeconomic variable is positive, which indicates that NCOs and consumer failure to repay rates will increase in the following months. The relative magnitude, either positive or negative, of macroeconomic variable reflects the rate at which the consumer failure to repay rate will change. The greater the magnitude of the macroeconomic variable, then the faster the consumer failure to repay rate will change.

As mentioned above, in an embodiment, the macroeconomic variable represents the magnitude of the difference between the values of the actual and equilibrium curves 404 and 402. However, it should be appreciated that, instead of being the actual difference between the values of the actual and equilibrium curves 404 and 402, the macroeconomic variable could be related to or proportional to the difference between the values of the actual and equilibrium curves 404 and 402.

Next, as represented at block 330, the process 300 involves incorporating the macroeconomic variables into credit-approval decision models to adjust credit-approval thresholds in light of the forecasted changes in consumer failure to repay rates. For illustrative convenience, this step of incorporating the macroeconomic variable into credit-approval decision models will be described with reference to FIG. 6, which provides a table 600 of exemplary macroeconomic variables that were calculated using the values of the actual and equilibrium curves 404 and 402 of FIG. 4. In table 600, a macroeconomic variable is provided for each month from May of 2006 to April of 2007. As illustrated in FIG. 4, between May of 2006 and June of 2007, the value of the actual curve 404 is lower than the value of the equilibrium curve 402. However, the difference between the curves 402 and 404 steadily decreases from May of 2006 to June of 2007 until July of 2007. Then the value of actual curve 404 switches from a value lower than the value of the equilibrium curve 402 to a value higher than the value of the equilibrium curve 402.

The macroeconomic variables provided in table 600 are consistent with the curves 402 and 404. For example, the values of the macroeconomic variables for the months of May 2006 through June 2007 are negative, and, during this time, the magnitudes of the macroeconomic variables steadily decrease from month to month. In July 2007, the macroeconomic variable becomes positive. However, the magnitude remains relatively small. Accordingly, for the months of May of 2006 to June of 2007, the macroeconomic variables indicate that NCOs and consumer failure to repay rates will decrease in the following months.

According to an embodiment, to implement a macroeconomic variable into credit-approval decision model, the process 300 involves reducing or increasing, depending on whether the macroeconomic variable is positive or negative, the credit-approval threshold by an amount equal to the macroeconomic variable or proportional in some way to the macroeconomic variable. For example, during the months of May of 2006 through June of 2007, the macroeconomic variables of table 600, which were implemented in the credit-approval decision model, reduced the decision model's credit-approval thresholds, thereby reducing the value of the qualifying creditworthiness scores and making it easier to get credit.

For example, for May of 2006, the credit-approval thresholds are reduced from their baseline by 0.08445. For June of 2006, the credit-approval thresholds are reduced from their baseline by 0.08203. However, for July of 2007, the macroeconomic variable is positive. Accordingly, for the month of July, implementing the macroeconomic variable into credit-approval decision model increases the credit-approval thresholds, thereby restricting credit. In particular, for July of 2007, the credit-approval thresholds are increased from their baseline by 0.00196.

Referring to the example provided above with reference to FIG. 2 where the credit-approval threshold was set to a creditworthiness score of 965. In that example, 965 was selected because, based on the data provided in the decision model 200, setting the credit-approval threshold to a creditworthiness score of 965 would result in a consumer failure to repay rate of 3.5%, which was the acceptable failure to repay rate chosen by the creditor institution. Suppose for example, that the decision model 200 was generated using July of 2007 data. In that case, the process 300, as represented at block 330, would involve incorporating the macroeconomic variable for July of 2007 into the decision model 200, and thereby adjusting any credit-approval thresholds determined using the decision model 200 to account for forecasted changes in consumer failure to repay rates. According to an embodiment, the macroeconomic variable for July of 2007 is implemented into the decision model 200 by increasing each of the listed creditworthiness scores by 0.00196. Accordingly, to account for forecasted increases in consumer failure to repay rates, the process 300 would increase the credit-approval threshold for July of 2007 from a creditworthiness score of 965 to a creditworthiness score of 965.00196.

As will be appreciated by one of ordinary skill in the art in view of this disclosure, the present invention may be embodied as a method, system, apparatus, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-readable medium having computer-usable program code embodied in the medium.

Any suitable computer-readable medium may be utilized, including a computer-readable storage medium and/or a computer-readable signal medium. The computer-readable storage medium may be, for example but not limited to, an electronic, magnetic, optical, electromagnetic, infrared, or semiconductor storage system, apparatus, or device. More specific examples of the computer-readable storage medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. A computer-readable signal medium may include a propagated data signal with computer program instructions embodied therein, for example, in base band or as part of a carrier wave. Such a propagated signal may take any of a variety of forms, including, but not limited to, electro-magnetic, optical, or any suitable combination thereof. In the context of this document, a computer-readable medium may be any medium that can contain, store, communicate, and/or transport the program for use by or in connection with the instruction execution system, apparatus, or device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations, and/or combinations of blocks in the flowchart illustrations, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart block(s). Alternatively, computer program implemented steps or acts may be combined with operator or human implemented steps or acts in order to carry out an embodiment of the invention.

FIG. 7 provides a block diagram of a credit-approval modeling environment 700, in accordance with one embodiment of the present invention. The credit-approval modeling environment 700 generally includes a credit-approval modeling system 710 in communication with one or more internal data sources 770 and one or more external data sources 780 via a network 702. The credit-approval modeling system 710 comprises a user-interface apparatus 720, a network-interface apparatus 740, and a memory apparatus 750 operatively coupled to a processing apparatus 730. As described above, embodiments of the credit-approval modeling system 710 are generally configured to evaluate consumer spending and borrowing patterns and, based thereon, forecast changes in consumer failure to repay rates. In this regard, in some embodiments of the invention, the credit-approval modeling system 710 is owned or maintained or operated by a creditor institution, and the credit-approval modeling system 710 may, in some embodiments, be integrated with other systems of such organization and may share at least some hardware, software, and/or other resources with such other systems. It should also be appreciated that the credit-approval modeling system 710 is owned or maintained or operated by a third party that provides credit-approval and failure to repay-rate information to the creditor institution. It should also be appreciated that the credit-approval modeling system 710 is owned or maintained or operated by any individual or business entity or non-business entity or portion thereof.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art that, although FIG. 7 illustrates the user interface 720, network interface 740, memory apparatus 750, and processing apparatus 730 as separate blocks in the block diagram, these separations may be merely conceptual. In other words, in some instances, the user interface 720, for example, is a separate and distinct device from the processing apparatus 730 and the memory apparatus 750 and therefore may have its own processor, memory, and software. In other instances, however, the user interface 720 is directly coupled to or integral with at least one part of the processing apparatus 730 and at least one part of the memory apparatus 750 and includes the user interface input and output hardware used by the processing apparatus 730 when the processing apparatus 730 executes user input and output software stored in the memory apparatus 750.

As will be described in greater detail below, in one embodiment, the credit-approval modeling system 710 is entirely contained within a user terminal, such as a personal computer or mobile terminal, while, in other embodiments, the credit-approval modeling system 110 includes a central computing system, one or more network servers, and one or more user terminals in communication with the central computing system via a network and the one or more network servers. FIG. 7 is intended to cover both types of configurations as well as other configurations that will be apparent to one of ordinary skill in the art in view of this disclosure.

The user interface 720 includes hardware and/or software for receiving input into the credit-approval modeling system 710 from a user and hardware and/or software for communicating output from the credit-approval modeling system 710 to a user. In some embodiments, the user interface 720 includes one or more user input devices, such as a keyboard, keypad, mouse, microphone, touch screen, touch pad, controller, and/or the like. In some embodiments, the user interface 720 includes one or more user output devices, such as a display (e.g., a monitor, liquid crystal display, one or more light emitting diodes, etc.), a speaker, a tactile output device, a printer, and/or other sensory devices that can be used to communicate information to a person. In one embodiment, the user interface 720 includes a user terminal In some embodiments, the network interface 740 is configured to receive electronic input from other devices in the network 702, including the internal data sources 770 and the external data sources 780. In some embodiments, the network interface 740 is further configured to send electronic output to other devices in a network. The network 702 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatus 730 includes circuitry used for implementing communication and logic functions of the credit-approval modeling system 710. For example, the processing apparatus 730 may include a digital signal processor device, a microprocessor device, and various analog-to-digital converters, digital-to-analog converters, and other support circuits. Control and signal processing functions of the credit-approval modeling system 110 are allocated between these devices according to their respective capabilities. The processing apparatus 730 may include functionality to operate one or more software programs based on computer-readable instructions thereof, which may be stored in the memory apparatus 750. As described in greater detail below, in one embodiment of the invention, the memory apparatus 750 includes a modeling application 760 and a data-retrieval application 765 stored therein for instructing the processing apparatus 740 to perform one or more operations of the procedures described herein and in reference to FIGS. 1 and 3. Some embodiments of the invention may include other computer programs stored in the memory apparatus 750.

In general, the memory apparatus 750 is communicatively coupled to the processing apparatus 730 and includes computer-readable storage medium for storing computer-readable program code and instructions, as well as datastores containing data and/or databases. More particularly, the memory apparatus 750 may include volatile memory, such as volatile Random Access Memory (RAM) including a cache area for the temporary storage of data. The memory apparatus 750 may also include non-volatile memory that can be embedded and/or may be removable. The non-volatile memory can, for example, comprise an EEPROM, flash memory, or the like. The memory apparatus 750 can store any of a number of pieces of information and data used by the credit-approval modeling system 710 to implement the functions of the credit-approval modeling system 710 described herein.

In the illustrated embodiment, the memory apparatus 750 includes datastore 752 for storing data, such as creditworthiness scores, credit-approval thresholds, macroeconomic variables, spending data, borrowing data, and NCO data. As further illustrated by FIG. 7, the memory apparatus 750 also includes the modeling application 760 and the data-retrieval application 765. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, each of the modeling application 760 and data-retrieval application 765 includes computer-readable instructions for instructing the processing apparatus 730 and/or other devices to perform one or more of the functions described herein, such as one or more of the functions described in FIGS. 1 and 3. While the modeling application 760 and data-retrieval application 765 are drawn as separate applications within the memory apparatus 750, it should be understood that the functions of the two applications as described herein could be ascribed to a single application or more than two applications.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method of determining a credit-approval threshold, the method comprising:
   providing a credit-approval threshold that corresponds to a predetermined failure to repay rate;
   receiving data taken across an aggregate of a plurality of consumers, wherein the data comprises:
      a total spending amount for the aggregate of the plurality of consumers over a period of time; and
      a total debt amount for the aggregate of the plurality of consumers over a period of time;
   determining, using a computer processing device, a value of a ratio, wherein the ratio comprises a comparison of a value of a logarithm of the total debt amount over the period of time for the aggregate of the plurality of consumers to a value of a logarithm of the total spending amount over the period of time for the aggregate of the plurality of consumers;
   determining, using a computer processing device, an equilibrium curve of the ratio that compares the value of the logarithm of the total debt amount over the period of time for the aggregate of the plurality of consumers to the value of the logarithm of the total spending amount over the period of time for the aggregate of the plurality of consumers;
   calculating, using a computer processing device, a value of a macroeconomic variable, wherein the value of the macroeconomic variable is based on a difference between the value of the ratio and the equilibrium curve of the ratio; and
   adjusting the credit-approval threshold corresponding to the predetermined failure to repay rate by an amount equal to the value of the macroeconomic variable.

2. The method of claim 1, wherein the credit-approval threshold is a creditworthiness score.

3. The method of claim 2, wherein the credit-approval threshold is established by:
   selecting a plurality of individuals;
   obtaining credit-history data about each of the plurality of individuals;
   assigning a creditworthiness score to each of the plurality of individuals;
   partitioning the plurality of individuals into a plurality of groups based on their respective creditworthiness scores;
   calculating an average failure to repay rate for each of the plurality of groups; and
   selecting as the credit-approval threshold the average creditworthiness score of a group of the plurality of groups that has a lowest predetermined average failure to repay rate.

4. The method of claim 1, further comprising:
   calculating the macroeconomic variable on a monthly basis; and
   readjusting the credit-approval threshold by an amount equal to the macroeconomic variable on a monthly basis.

5. The method of claim 4, wherein the total spending amount represents the plurality of consumers' aggregated personal consumption expenditures.

6. The method of claim 5, wherein the total borrowing amount represents the plurality of consumers' aggregated revolving credit outstanding.

7. The method of claim 6, wherein consumers' aggregated revolving credit outstanding and consumers' aggregated personal consumption expenditures are received on a monthly basis and the macroeconomic variable is calculated on a monthly basis.

8. The method of claim 7, wherein the value of the logarithm of the total debt amount of the plurality of consumers is determined by calculating a monthly rate of change of the plurality of consumers' aggregated revolving credit outstanding.

9. The method of claim 8, wherein the value of the logarithm of the total spending amount is determined by calculating a monthly rate of change of the plurality of consumers' aggregated personal consumption expenditures.

10. A system comprising:
a database comprising:
credit-history data about each of a plurality of individuals;
a creditworthiness score for each of the plurality of individuals;
a credit-approval threshold that corresponds to a predetermined failure to repay rate;
a total debt amount for an aggregate of the plurality of individuals based on data taken across a plurality of consumers over a period of time; and
a total spending amount for an aggregate of the plurality of individuals based on data taken across the plurality of individuals over a period of time;
a processor associated with the database and configured to execute an application for calculating a value of a macroeconomic variable;
wherein the application when executed by the processor causes the processor to:
determine a value of a ratio, wherein the ratio comprises a comparison of a value of a logarithm of the total debt amount over the period of time for the aggregate of the plurality of individuals to a value of a logarithm of the total spending amount over the period of time for the aggregate of the plurality of individuals;
determine an equilibrium curve of the ratio that compares the value of the logarithm of the total debt amount over the period of time for the aggregate of the plurality of individuals to the value of the logarithm of the total spending amount over the period of time for the aggregate of the plurality of individuals; and
calculate the value of the macroeconomic variable, wherein the value of the macroeconomic variable is equal to a difference between the value of the ratio and the equilibrium curve of the ratio; and
adjust the credit-approval threshold corresponding to the predetermined failure to repay rate by an amount equal to the value of the macroeconomic variable.

11. The system of claim 10, wherein the application executed by the processor is further configured to:
calculate the macroeconomic variable on a monthly basis; and
adjust the credit-approval threshold by an amount equal to the macroeconomic variable on a monthly basis.

12. The system of claim 11, wherein the total spending amount represents the plurality of consumers' aggregated personal consumption expenditures.

13. The system of claim 12, wherein the total debt amount represents the plurality of consumers' aggregated revolving credit outstanding.

14. The system of claim 13, wherein consumers' aggregated revolving credit outstanding and consumers' aggregated personal consumption expenditures are received on a monthly basis.

15. The system of claim 14, wherein the value of the logarithm of the total debt amount is determined by calculating a monthly rate of change of the plurality of consumers' aggregated revolving credit outstanding.

16. The system of claim 15, wherein the value of the logarithm of the total spending amount is determined by calculating a monthly rate of change of the plurality of consumers' aggregated personal consumption expenditures.

17. A computer program product configured to adjust credit-approval thresholds, the computer program product comprising a non-transitory computer-readable medium having computer-readable program instructions stored therein, wherein the computer-readable program instructions comprise instructions to:
instructions for selecting a plurality of individuals;
instructions for obtaining credit-history data about each of the plurality individuals;
instructions for assigning a creditworthiness score to each of the plurality of individuals;
instructions for providing at least a credit-approval threshold that corresponds to a predetermined failure to repay rate;
instructions configured to receive data taken across a plurality of individuals nationwide, wherein the data comprises:
a total spending amount for the plurality of individuals; and
a total debt amount for the plurality of individuals;
instructions configured to determine a value of a ratio, wherein the ratio comprises a comparison of a value of a logarithm of the total debt amount over a period of time for the plurality of individuals to a value of a logarithm of the total spending amount over the period of time for the plurality of individuals;
instructions configured to determine an equilibrium curve of the ratio that compares the value of the logarithm of the total debt amount over the period of time for the plurality of individuals to the value of the logarithm of the total spending amount over the period of time for the plurality of individuals;
instructions configured to calculate a value of a macroeconomic variable, wherein the value of the macroeconomic variable is equal to a difference between the value of the ratio and the equilibrium curve of the ratio; and
instructions configured to adjust the credit-approval threshold on a monthly basis by an amount equal to the macroeconomic variable.

18. The computer program product of claim 17, wherein the total spending amount represents the plurality of consumers' aggregated personal consumption expenditures.

19. The computer program product of claim 18, wherein the total borrowing amount represents the plurality of consumers' aggregated revolving credit outstanding.

20. The computer program product of claim 19, wherein the plurality of consumers' aggregated revolving credit outstanding and consumers' aggregated personal consumption expenditures are received on a monthly basis and the macroeconomic variable is calculated on a monthly basis.

21. The computer program product of claim 20, wherein the value of the logarithm of the total debt amount is determined by calculating a monthly rate of change of the plurality of consumers' aggregated revolving credit outstanding.

22. The computer program product of claim 21, wherein the value of the logarithm of the total spending amount is determined by calculating a monthly rate of change of the plurality consumers' aggregated personal consumption expenditures.

23. A system for determining a credit-approval threshold, the system comprising:
a memory device comprising:
computer-readable program code, wherein said computer program code is specifically configured to cause one or more processors to perform operations when performing the computer program code;

a total spending amount for a plurality of consumers over a period of time;

a total debt amount for the plurality of consumers over a period of time; and a processor operatively coupled to the user interface and the memory device and configured to execute the computer-readable program code to:

provide a credit-approval threshold that corresponds to a predetermined failure to repay rate;

determine a value of a ratio, wherein the ratio comprises a comparison of a value of a logarithm of the total debt amount over the period of time for the aggregate of the plurality of consumers to a value of a logarithm of the total spending amount over the period of time for the aggregate of the plurality of consumers;

determine an equilibrium curve of the ratio that compares the value of the logarithm of the total debt amount over the period of time for the plurality of consumers to the value of the logarithm of the total spending amount over the period of time for the plurality of consumers;

calculate a value of a macroeconomic variable, wherein the value of the macroeconomic variable is based on a difference between the value of the ratio and the equilibrium curve of the ratio; and adjust the credit-approval threshold corresponding to the predetermined failure to repay rate by an amount equal to the value of the macroeconomic variable.

24. The system of claim 23, wherein the processor is configured to further execute the computer-readable program code to provide the credit-approval threshold by:

selecting a plurality of individuals;

obtaining credit-history data about each of the plurality of individuals;

assigning a creditworthiness score to each of the plurality of individuals;

partitioning the plurality of individuals into a plurality of groups based on their respective creditworthiness scores;

calculating an average failure to repay rate for each of the plurality of groups; and providing as the credit-approval threshold the average creditworthiness score of a group of the plurality of groups that has a lowest predetermined average failure to repay rate.

25. The system of claim 24, wherein the processor is configured to further execute the computer-readable program code to:

calculate the macroeconomic variable on a monthly basis; and readjust the credit-approval threshold by an amount equal to the macroeconomic variable on a monthly basis.

26. The system of claim 25, wherein the total spending amount represents the plurality of consumers' aggregated personal consumption expenditures.

27. The system of claim 26, wherein the total borrowing amount represents the plurality of consumers' aggregated revolving credit outstanding.

28. The system of claim 27, wherein the plurality of consumers' aggregated revolving credit outstanding and the plurality of consumers' aggregated personal consumption expenditures are received on a monthly basis and the macroeconomic variable is calculated on a monthly basis.

29. The system of claim 28, wherein the value of the logarithm of the total debt amount is determined by calculating a monthly rate of change of the plurality of consumers' aggregated revolving credit outstanding.

30. The system of claim 29, wherein the value of the logarithm of the total spending amount is determined by calculating a monthly rate of change of the plurality consumers' aggregated personal consumption expenditures.

* * * * *